(12) United States Patent
Tanaka et al.

(10) Patent No.: US 8,212,918 B2
(45) Date of Patent: Jul. 3, 2012

(54) IMAGE PICKUP APPARATUS SHUTTER CONTROL

(75) Inventors: Yoshiharu Tanaka, Osaka (JP); Nobuharu Murashima, Nara (JP)

(73) Assignee: Sony Corporation, Tokyo (JP)

( * ) Notice: Subject to any disclaimer, the term of this patent is extended or adjusted under 35 U.S.C. 154(b) by 398 days.

(21) Appl. No.: 12/510,486

(22) Filed: Jul. 28, 2009

(65) Prior Publication Data

US 2010/0045852 A1 Feb. 25, 2010

(30) Foreign Application Priority Data

Aug. 19, 2008 (JP) ................. 2008-210392

(51) Int. Cl.
*H04N 5/235* (2006.01)
*H04N 3/14* (2006.01)
*G03B 7/12* (2006.01)
*G03B 7/00* (2006.01)

(52) U.S. Cl. ......... 348/362; 348/296; 396/215; 396/235

(58) Field of Classification Search ................. 348/362, 348/363, 367, 368, 374, 296, 297, 208.99; 396/213, 215, 235

See application file for complete search history.

(56) References Cited

U.S. PATENT DOCUMENTS

| 6,542,194 | B1 * | 4/2003 | Juen | 348/296 |
| 7,864,242 | B2 * | 1/2011 | Namai et al. | 348/362 |
| 7,907,206 | B2 * | 3/2011 | Toyoda | 348/363 |
| 2006/0098115 | A1 * | 5/2006 | Toyoda | 348/362 |
| 2008/0260374 | A1 * | 10/2008 | Kawashima | 396/225 |

FOREIGN PATENT DOCUMENTS

JP 2007-228047 9/2007

* cited by examiner

*Primary Examiner* — Nhan T Tran
(74) *Attorney, Agent, or Firm* — Oblon, Spivak, McClelland, Maier & Neustadt, L.L.P.

(57) ABSTRACT

An image pickup apparatus includes a controlling unit moving an electronic front curtain in a simulated manner from an exposure start position towards an exposure end position by successively performing reset operations on a plurality of pixels in an image pickup element in a predetermined direction; a rear curtain that moves from the exposure start position towards the exposure end position by a biasing force of a biasing unit; and a storage unit storing data indicating a change in movement characteristics of the rear curtain with time. On the basis of the data, the controlling unit changes movement characteristics of the electronic front curtain in accordance with the change in the movement characteristics of the rear curtain with the time.

11 Claims, 14 Drawing Sheets

IMAGE PICKUP APPARATUS SHUTTER CONTROL

BACKGROUND OF THE INVENTION

1. Field of the Invention

The present invention relates to an image pickup apparatus, such as a digital camera. More particularly, the present invention relates to a shutter control technology.

2. Description of the Related Art

As a shutter device used in an image pickup apparatus, a shutter device that successively moves a front blade group (front curtain) and a rear blade group (rear curtain) and that performs an exposure operation using a slit formed between both of the blade groups (that is, between the front curtain and the rear curtain) is available. In such a shutter device, the front curtain and the rear curtain are moved in predetermined directions from an exposure start position towards an exposure end position by biasing forces of springs, respectively.

In recent years, an image pickup apparatus in which, among a front curtain and a rear curtain of a shutter device, the front curtain is replaced by one that performs electronic operations (such as successively performing a reset operation with every line in an image pickup element) is available (refer to, for example, Japanese Unexamined Patent Application Publication No. 2007-228047).

SUMMARY OF THE INVENTION

However, in such shutter devices described above, the biasing force of the spring that biases the rear curtain in a predetermined direction is gradually reduced in accordance with an increase in the number of expansions and compressions of the spring (that is, in accordance with the number of movements of the rear curtain). Therefore, the movement speed of the rear curtain is gradually reduced in accordance with the number of movements of the rear curtain. Consequently, an arrival time of the rear blade to the exposure end position is later than an actual time.

As a result, in particular, in a shutter device using an electronic front curtain, an exposure period (the difference between a passage time of the front curtain and a passage time of the rear blade) near the exposure end position is longer than an actual exposure period. An exposure period near the exposure start position is substantially close to a theoretical value. Therefore, the exposure period near the exposure end position is longer than the exposure period near the exposure start position. Accordingly, the shutter device has a problem in which there are variations in the exposure periods (shutter speeds) in the respective positions in an image pickup area.

Japanese Unexamined Patent Application Publication No. 2007-228047 discusses a technology that corrects brightness with respect to image data in accordance with a detection result of a detecting unit that detects movements of blade groups. However, providing such a detecting unit is not advantageous from the viewpoints of space and costs.

To overcome such problems, it is desirable to provide an image pickup apparatus that can precisely and easily control an exposure time by considering changes of movement characteristics of a rear curtain with time.

According to an embodiment of the present invention, there is provided an image pickup apparatus including controlling means for moving an electronic front curtain in a simulated manner from an exposure start position towards an exposure end position by successively performing reset operations on a plurality of pixels in an image pickup element in a predetermined direction; a rear curtain that moves from the exposure start position towards the exposure end position by a biasing force of biasing means; and storage means for storing data indicating a change in movement characteristics of the rear curtain with time. On the basis of the data, the controlling means changes movement characteristics of the electronic front curtain in accordance with the change in the movement characteristics of the rear curtain with the time.

According to the present invention, it is possible to precisely and easily control an exposure period in accordance with changes with time of the biasing force of the biasing unit of the rear blade.

DESCRIPTION OF THE PREFERRED EMBODIMENTS

A description will hereunder be given of an embodiment of the present invention with reference to the drawings.

1. Overview of Structure

Figure 1:
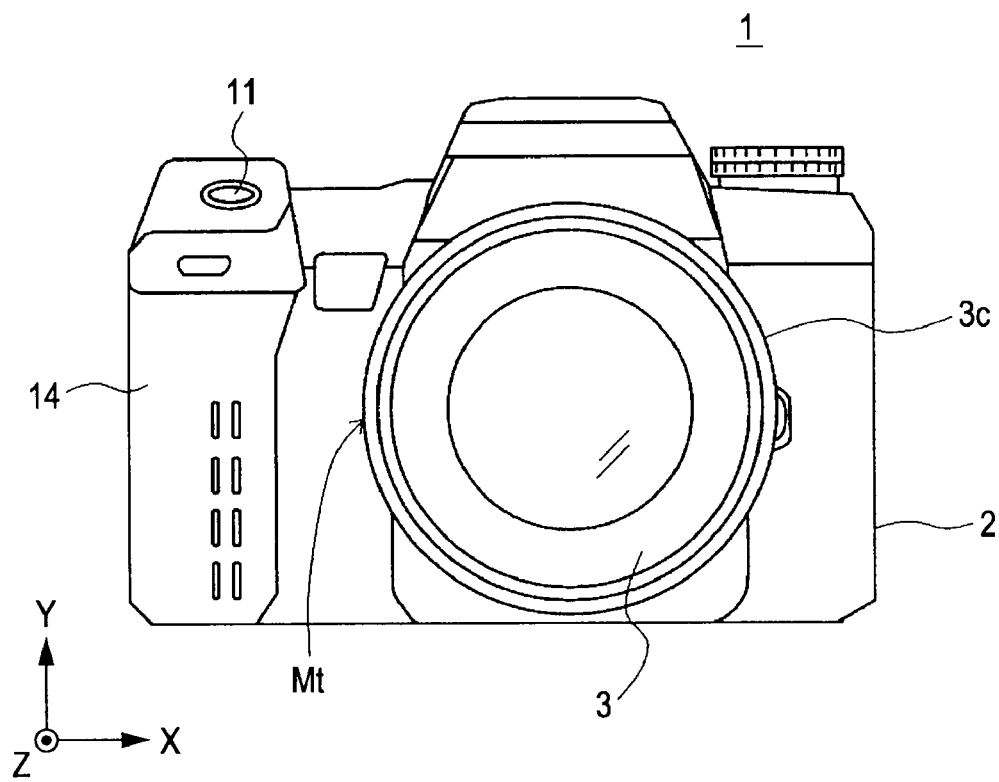
FIG. 1 is a front external view of an image pickup apparatus.
Figure 2:
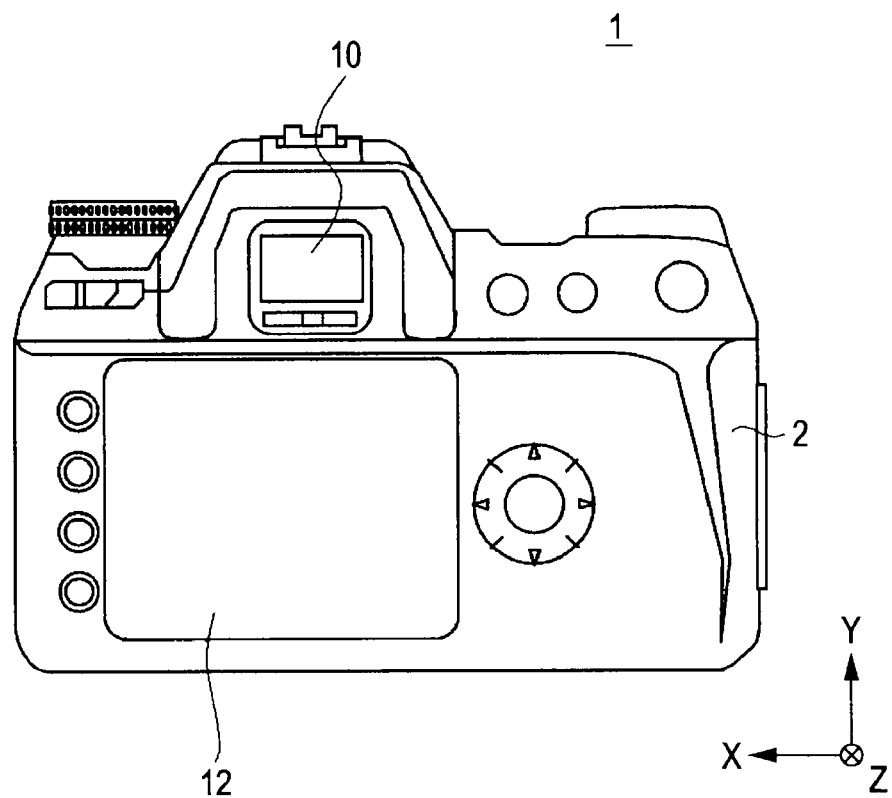
FIG. 2 is a rear external view of the image pickup apparatus.

FIGS. 1 and 2 are external views of the structure of an image pickup apparatus 1 according to the embodiment of the present invention. Here, FIG. 1 is a front external view of the image pickup apparatus 1, and FIG. 2 is a rear external view of the image pickup apparatus 1. The image pickup apparatus 1 is formed as a digital camera of a lens-replacement single-lens reflex type.

As shown in FIG. 1, the image pickup apparatus 1 includes a camera body 2. A replacement-type shooting lens unit (replacement lens) 3 is removable with respect to the camera body 2.

The shooting lens unit 3 primarily includes, for example, a barrel 3c, a lens group 3e (see FIG. 3), provided in the barrel 3c, and a stop. The lens group 3e (shooting optical system)

includes, for example, a focus lens that changes a focus position by moving in an optical axis direction.

An annular mount section Mt to which the shooting lens unit 3 is mounted is provided at substantially the center of a front surface of the camera body 2.

The camera body 2 is provided with a grip section 14 for allowing a shooter to grip a left end portion of the front surface of the camera body 2. A release button 11 for indicating a start of exposure is provided at a top surface of the grip section 14. A battery accommodation chamber and a card accommodation chamber are provided in the grip section 14. As a power supply of the camera, a battery, such as a lithium-ion battery, is accommodated in the battery chamber. A memory card 90 (see FIG. 3) for recording image data of a shooting image is removably accommodated in the card chamber.

The release button 11 is a two-stage detection button that can detect two states, that is, a partially pressed state (state S1) and a fully pressed state (state S2). When the release button 11 is partially pressed and is set in the state S1, a preparation operation (such as an AF control operation) for obtaining a recording still image (actual shooting image) of an object is carried out. When the release button 11 is further pressed, and is set in the state S2, a shooting operation of the actual shooting image is carried out. More specifically, an exposure operation of an object image (optical image of an object) is carried out using an image pickup element 5 (described later), and a series of operations for carrying out predetermined image processing on an image signal obtained by the exposure operation is executed. Accordingly, when the release button 11 is set in the partially pressed state S1, the image pickup apparatus 1 determines that a shooting preparation command is applied, and starts the shooting preparation operation. When the release button 11 is set in the fully pressed state S2, the image pickup apparatus 1 determines that a shooting command is applied, and starts the shooting operation.

In FIG. 2, a finder window (eyepiece window) 10 is provided at a substantially center top portion of a back surface of the camera body 2. When a shooter looks through the finder window 10, the shooter can visually recognize the optical image of the object guided from the shooting lens unit 3 and determine a frame. That is, it is possible to determine the frame by using an optical finder.

In FIG. 2, a rear monitor 12 is provided at substantially the center of the back surface of the camera body 2. The rear monitor 12 is formed as, for example, a color liquid crystal display (LCD).

The rear monitor 12 can, for example, screen-display a menu for setting, for example, shooting conditions, and can reproduce and display the shooting image recorded on the memory card 90 in a reproduction mode.

2. Functional Block of Image Pickup Apparatus

Figure 3:
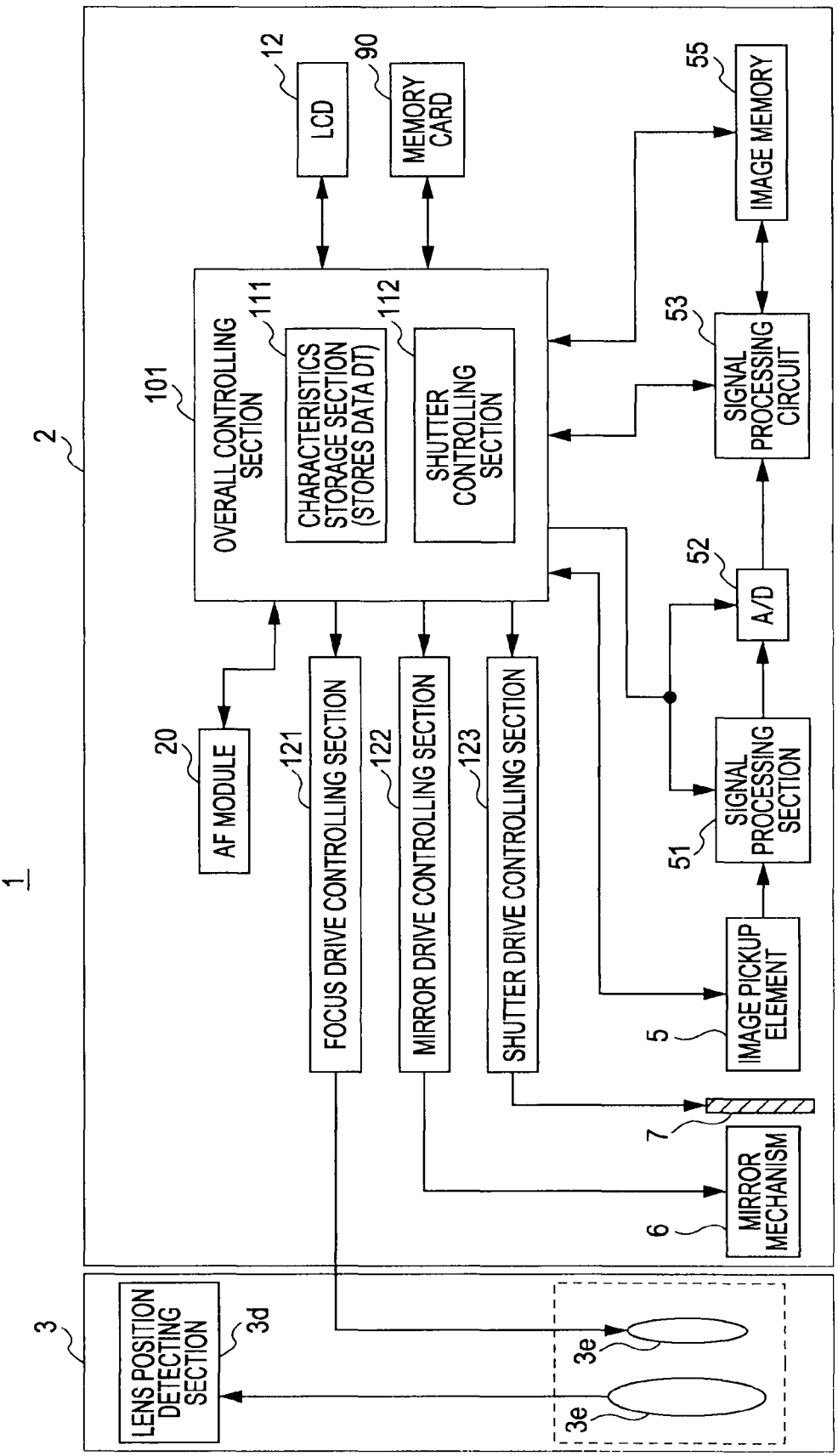
FIG. 3 is a block diagram of a functional structure of the image pickup apparatus.

Next, with reference to FIG. 3, a general description of the functions of the image pickup apparatus 1 will be given. FIG. 3 is a block diagram of a functional structure of the image pickup apparatus 1.

As shown in FIG. 3, the image pickup apparatus 1 includes, for example, an AF module 20, an overall controlling section 101, a focus drive controlling section 121, a mirror drive controlling section 122, a shutter drive controlling section 123, and a digital signal processing circuit 53.

Using light entering through a mirror mechanism 6, the AF module 20 can detect a focus state of an object by a focus state detecting method based upon phase differences. In accordance with the focus state of the object detected by the AF module 20, the overall controlling section 101 realizes an AF operation using the focus drive controlling section 121. In particular, when the AF module 20 based upon phase differences is used, it is possible to determine a focusing lens position at a very high speed.

In cooperation with the overall controlling section 101, the focus drive controlling section 121 realizes a focus control operation. More specifically, the focus drive controlling section 121 generates a control signal on the basis of a signal input from the overall controlling section 101, and moves the focus lens included in the lens group 3e of the shooting lens unit 3. The position of the focus lens is detected by a lens position detecting section 3d of the shooting lens unit 3, and data indicating the position of the focus lens is transmitted to the overall controlling section 101. In this way, the focus drive controlling section 121 controls, for example, the movement of the focus lens in an optical axis direction.

The mirror drive controlling section 122 controls switching between a state in which the mirror mechanism 6 is withdrawn from an optical path (mirror upward state) and a state in which the mirror mechanism 6 blocks the optical path (mirror downward state). The mirror drive controlling section 122 performs the switching between the mirror upward state and the mirror downward state by generating a control signal on the basis of a signal input from the overall controlling section 101.

The shutter drive controlling section 123 controls the movement of a shutter device 7 (more specifically, the movement of a rear curtain) by generating a control signal on the basis of a signal input from the overall controlling section 101.

The shutter device 7 is disposed close to the image pickup element 5 at an object side of the image pickup element 5. The shutter device 7 is what is called a focal-plane shutter. The shutter device 7 is disposed so as to be substantially perpendicular to an optical axis of the shooting lens unit 3. More specifically, the shutter device 7 is disposed so that a center position of an opening OP (described later) of the shutter device 7 is aligned with the optical axis of the shooting lens unit 3. The shutter device 7 includes a mechanical rear curtain as described below.

Behind the shutter device 7, the image pickup element 5 is disposed substantially perpendicularly to the optical axis of the shooting lens unit 3.

The image pickup element (here a CMOS sensor) 5 is a photodetector that converts the optical image of the object (object image) from the shooting lens unit 3 into an electrical signal by photoelectric conversion, and generates and obtains the image signal (recording image signal) of the actual shooting image.

The image pickup element 5 (refer also to FIG. 4) responds to drive control signals (a storage start signal and a storage end signal) from the overall controlling section 101, and performs exposure on the object image formed at a light-receiving surface (charge storage by the photoelectric conversion). The image pickup element 5 also responds to a read-out control signal from the overall controlling section 101, and outputs the image signal to a signal processing section 51.

When the signal processing section 51 performs a predetermined analog signal processing operation on the image signal obtained at the image pickup element 5, the image signal resulting from the analog signal processing operation is converted into digital image data (image data) by an A/D converting circuit 52. The image data is input to the digital signal processing circuit 53.

The digital signal processing circuit 53 performs a digital signal processing operation on the image data input from the A/D converting circuit 52. The digital signal processing circuit 53 includes, for example, a black level correcting circuit, a white balance (WB) circuit, and a γ correcting circuit. The digital signal processing circuit 53 performs various digital image processing operations. The image signal (image data) processed by the digital signal processing circuit 53 is stored in an image memory 55. The image memory 55 is an image memory which temporarily stores the generated image data, which is accessible at a high speed, and which has a capacity allowing it to store the image data of a plurality of frames.

During actual shooting, the image data temporarily stored in the image memory 55 is subjected to image processing (such as compression) at the overall controlling section 101 when necessary, after which the resulting image data is stored in the memory card 90.

In cooperation with, for example, the AF module 20 and the focus drive controlling section 121, the overall controlling section 101 performs a focusing control operation that controls the position of the focus lens.

The overall controlling section 101 is formed as a microcomputer, and, primarily, includes, for example, a CPU, a memory, and ROM (such as EEPROM). The overall controlling section 101 reads out a program stored in ROM, and executes the program at the CPU to realize various functions.

More specifically, the overall controlling section 101 includes, for example, a characteristics storage section 111 and a shutter controlling section 112.

In cooperation with the shutter drive controlling section 123, the shutter controlling section 112 controls the shutter device 7. By, for example, sending out an exposure start signal (that is, a charge reset signal) to the image pickup element 5, the shutter controlling section 112 controls the movement of an electronic front curtain of the image pickup element 5. By driving various driving sections of the shutter device 7 through the shutter drive controlling section 123, the shutter controlling section 112 controls driving of the mechanical rear curtain.

The characteristics storage section 111 is a storage section that stores movement characteristics of the mechanical rear curtain in the shutter device 7. The characteristics storage section 111 stores changes in the movement characteristics due to deterioration of a spring 88 (described later) of the rear curtain with time.

The shutter controlling section 112 controls the movement of the electronic front curtain on the basis of movement characteristics data stored in the characteristics storage section 111. This controlling operation will be described in detail below.

3. Structure of Shutter Device

Figure 5:
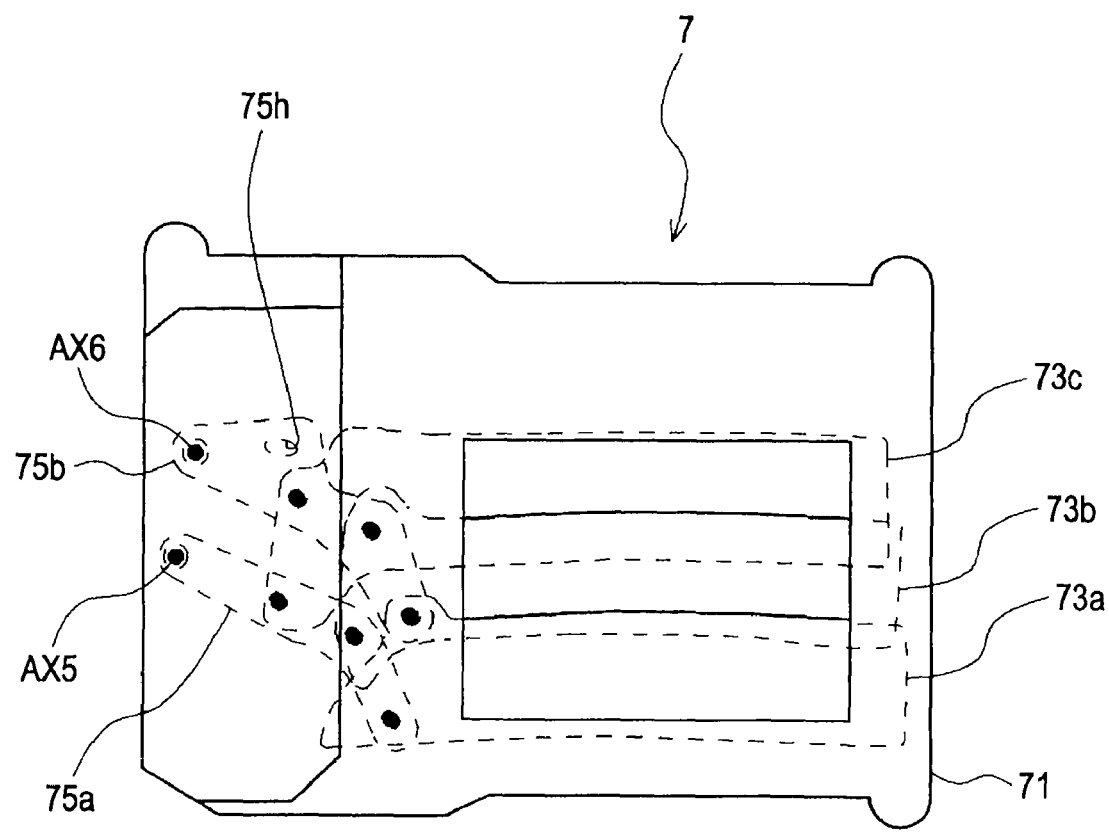
FIG. 5 is a schematic view of the structure of a shutter device.
Figure 6:
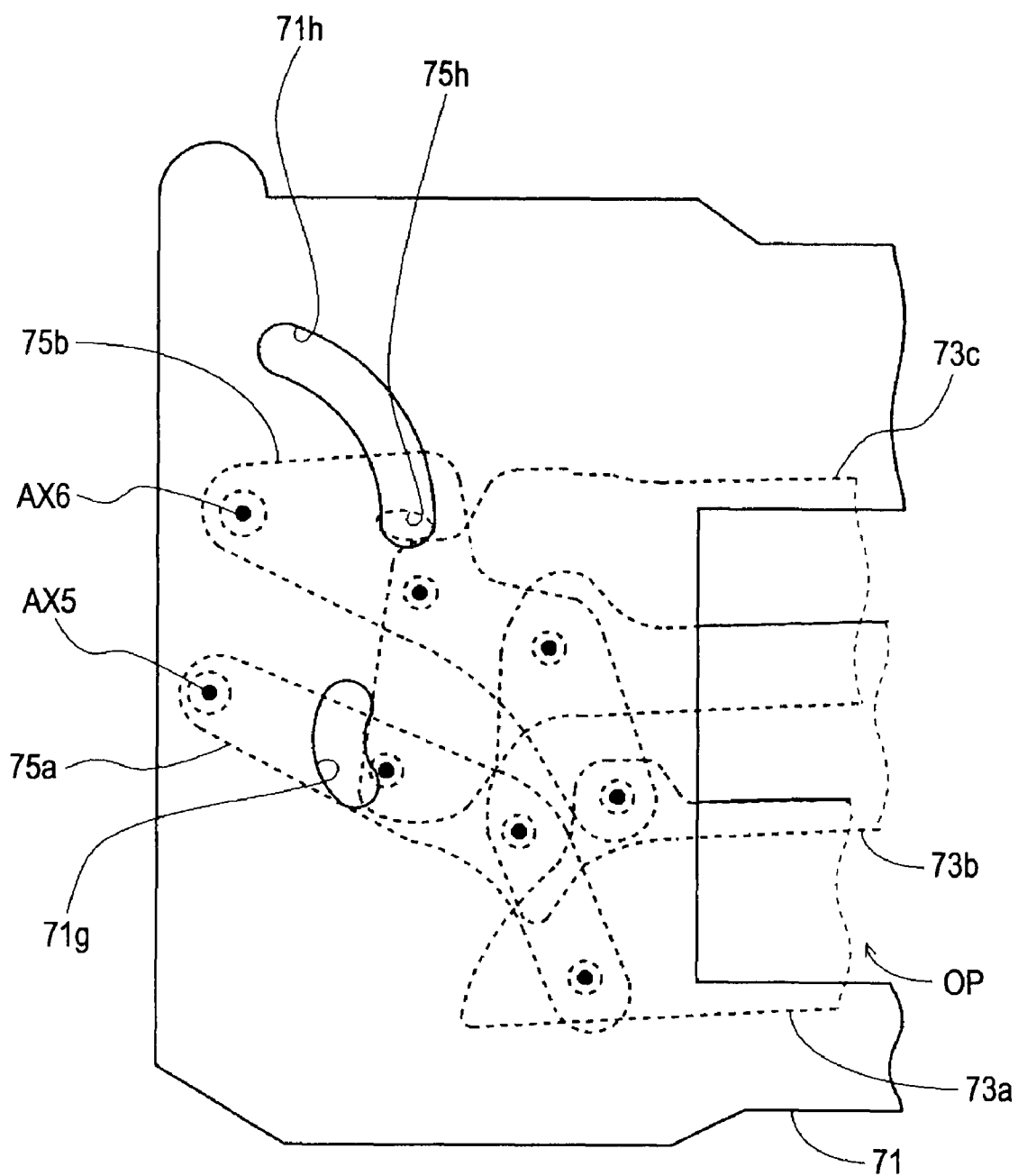
FIG. 6 is an enlarged view of a portion of the shutter device (closed state of an opening)
Figure 7:
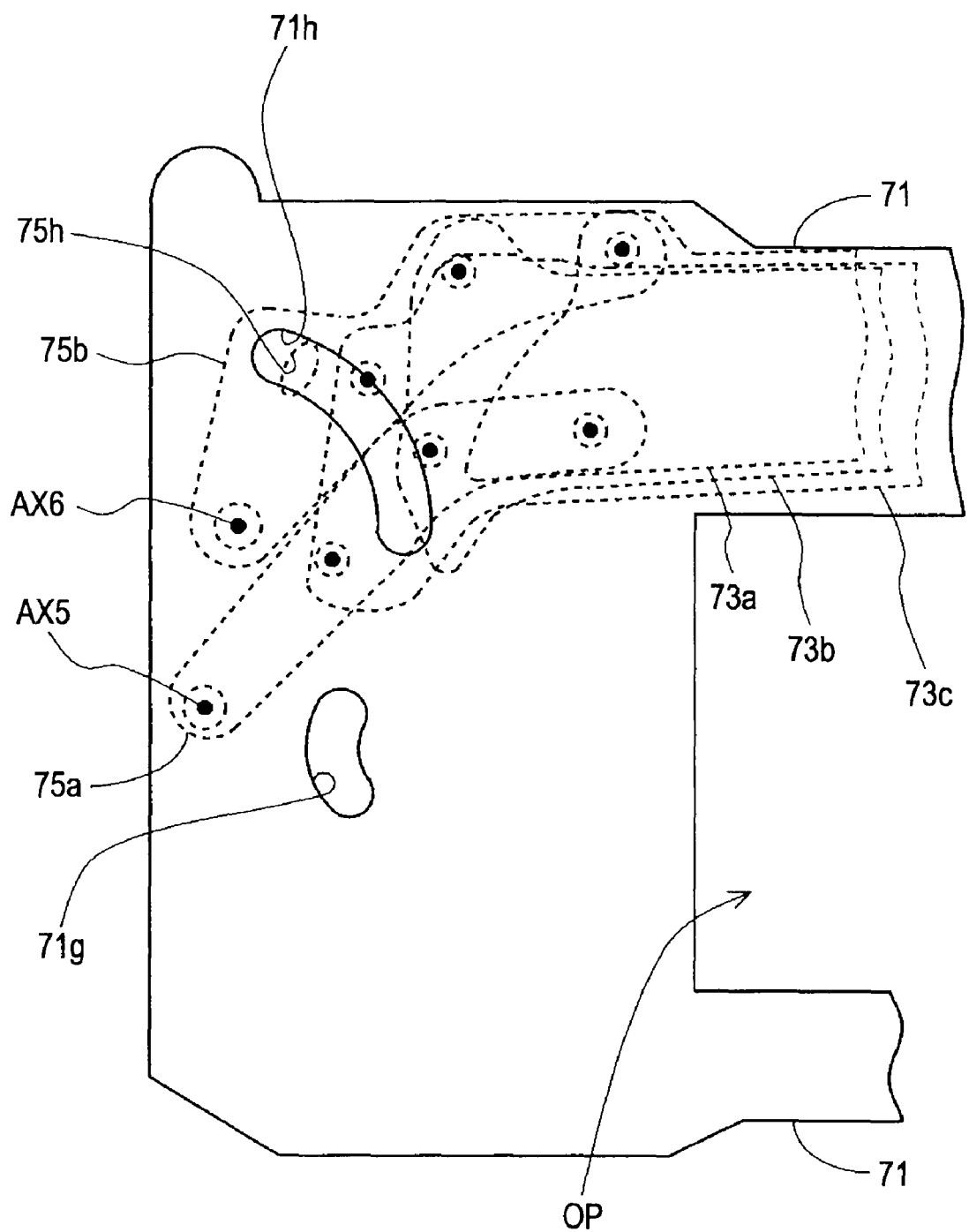
FIG. 7 is an enlarged view of the portion of the shutter device (open state of the opening)

FIG. 5 is a schematic view of the structure of the shutter device 7. FIGS. 6 and 7 are enlarged views of a portion of the shutter device 7 (that is, the left side thereof in FIG. 5). FIGS. 5 to 7 primarily show, for example, the structure of the rear curtain, and does not show, for example, the structure of a driving mechanism 80 (described next) of the rear curtain.

In the image pickup apparatus 1, what is called the electronic front curtain is used as the front curtain. For example, a process (such as that shown in FIG. 4) in which a reset operation is successively executed in a predetermined direction for every predetermined unit (for example, for every horizontal line Li) in the image pickup element 5 corresponds to a movement of the electronic front curtain. That is, by successively resetting a plurality of pixels in the image pickup element 5 in the predetermined direction, the electronic front curtain moves in a simulated manner from an exposure start position to an exposure end position. In other words, by shifting a reset timing immediately before exposure of each pixel in the image pickup element 5 for each predetermined area (such as a horizontal line) in the image pickup element 5, the electronic front curtain moves in the simulated manner.

More specifically, first, a reset operation for the pixel of a horizontal line L1 is executed. Then, a reset operation for the pixel of a horizontal line L2 is executed. Similarly, reset operations for the pixels of a horizontal line L3 and on are successively executed for respective lines. Then, finally, a reset operation for the pixel of a last horizontal line Ln is executed. In this way, the process in which the reset operations for the respective pixels are executed for the respective horizontal lines Li from the horizontal line L1 to the horizontal line Ln (more specifically, the process of resetting stored charges for the respective pixels) is executed as the movements of the electronic front curtain. In each pixel, an exposure operation (charge storage) is started after the reset operations.

When the mechanical rear curtain moves from the exposure start position towards the exposure end position so as to pursue a front end position of the electronic front curtain that is moving, a light-interception operation is performed by the rear curtain, so that the exposure operations are realized in a very small period of time. At this time, focusing upon a certain pixel in the image pickup element 5, the exposure operation is performed on this pixel over a period TE from a time T1 immediately after the reset operation of this pixel in the image pickup element 5 to a time T2 at which the rear curtain covers this pixel and intercepts light. The period TE is equal to T2-T1. The length of the period TE (such as 1/100 seconds) corresponds to a shutter speed.

Structurally, the shutter device 7 includes only the rear curtain among the front and rear curtains. Therefore, structurally, it does not include the front curtain.

As shown in FIG. 5, the shutter device 7 includes a shutter bottom plate 71, rear blade groups 73*a*, 73*b*, and 73*c*, and arms 75*a* and 75*b*. The shutter device 7 also includes an auxiliary bottom plate 72 (see FIG. 10), having a shape that is substantially the same as that of the shutter bottom plate 71, at the back side of the shutter bottom plate 71. Both of the bottom plates 71 and 72, which are separated from each other by a predetermined distance, oppose each other.

The shutter bottom plate 71 has an opening OP (also see, for example, FIG. 7) for exposure at substantially the center thereof. Similarly, the auxiliary bottom plate 72 also has an opening OP for exposure at substantially the center thereof. The opening OP of the shutter bottom plate 71 and the opening OP of the auxiliary bottom plate 72 have substantially the same shapes (substantially rectangular shapes), and are provided at positions opposing each other. When the shutter device 7 is in an assembled state, these openings are combined with each other to form an opening OP for exposure in the shutter device 7.

Two arc-shaped elongated holes 71*g* and 75*h* (see FIG. 6) are formed in the shutter bottom plate 71. The elongated hole 71*g* is provided along an arc having a predetermined radius r1 and having an axis AX3 (described later; see FIG. 11) as a center. The elongated hole 71*h* is provided along an arc having a predetermined radius r2 and having an axis AX1 (described later) as a center.

The rear blade groups 73*a*, 73*b*, and 73*c* are provided between the shutter bottom plate 71 and the auxiliary bottom plate 72. In other words, the rear blade groups 73*a*, 73*b*, and 73*c* are provided at the back side of the shutter bottom plate 71. The rear blade groups 73*a*, 73*b*, and 73*c* are thin plates having light-shielding properties. These rear blade groups 73*a*, 73*b*, and 73*c* constitute the rear curtain. Here, although the case in which the rear curtain is formed by the three rear blade groups 73a, 73b, and 73c is described, the present invention is not limited thereto. Therefore, the rear curtain may be formed by two or less than two blade groups or by four or more blade groups.

The rear blade groups 73a, 73b, and 73c are all rotatably connected to an arm 75a and to an arm 75b. The arm 75a is rotatable around an axis AX5 as a center, and the arm 75b is rotatable around an axis AX6 as a center. Here, the axis AX6 is the same as the axis AX1 (described below).

As shown in FIGS. 5 and 6, when the arm 75a and the arm 75b exist at predetermined positions, the rear curtain including the rear blade groups 73a, 73b, and 73c close the opening OP, so that a closed state of the opening OP is realized by the rear curtain. When, from this state, the arm 75b rotates counterclockwise around the axis AX6 as the center, the arm 75a also rotates counterclockwise around the axis AX5 as the center, so that, as shown in FIG. 7, the rear curtain formed by the rear blade groups 73a, 73b, and 73c withdraw from the opening OP. That is, an open state of the opening OP is realized by the rear curtain. In contrast, when, from the state shown in FIG. 7, the arm 75b rotates clockwise around the axis AX6 as the center, the arm 75a also rotates clockwise around the axis AX5 as the center, so that the state of the opening OP changes to a closed state of the opening OP shown in FIG. 6.

The position of each of the rear blade groups 73a, 73b, and 73c in FIG. 6 is also called "exposure end position." The position of each of the rear blade groups 73a, 73b, and 73c in FIG. 7 is also called "exposure start position." After the rear curtain moves from the exposure start position towards the exposure end position, the rear curtain covers the opening OP (see FIG. 6), whereas, after the rear curtain moves from the exposure end position to the exposure start position, the rear curtain opens the opening OP (see FIG. 7). In other words, at the exposure start position, the opening OP is not covered by the rear curtain and is open. In contrast, at the exposure end position, the opening OP is covered by the rear curtain.

Figure 8:
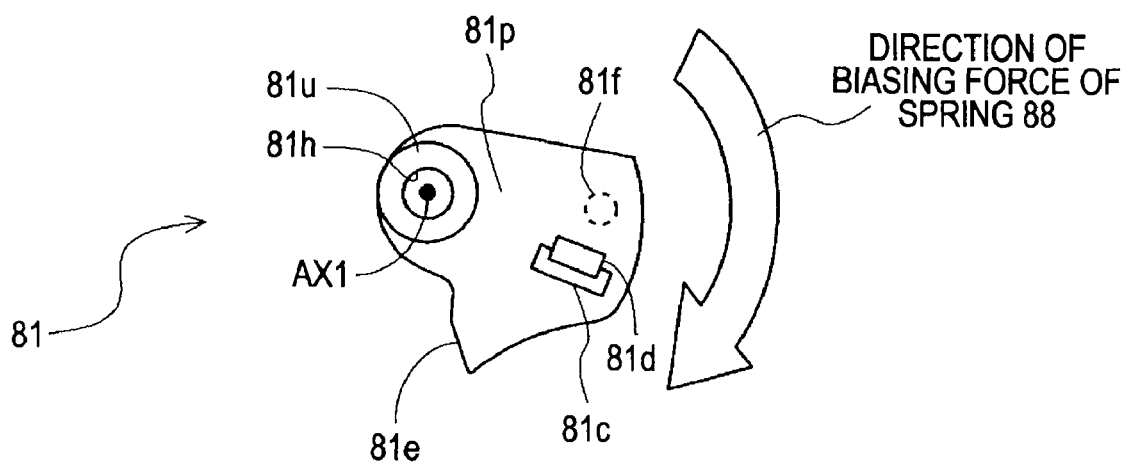
FIG. 8 shows a driving member.
Figure 9:
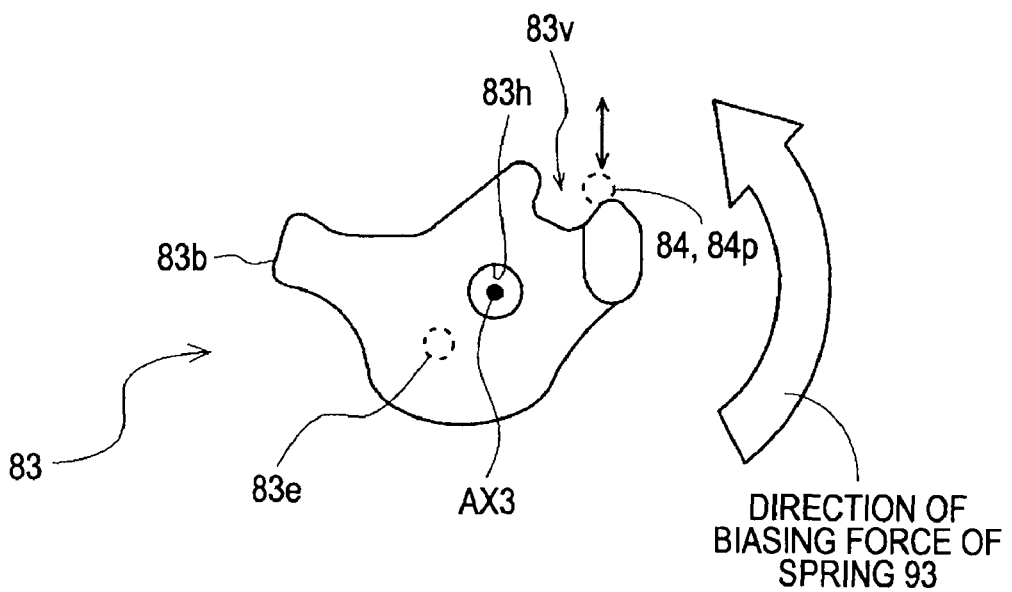
FIG. 9 shows a charging member.
Figure 10:
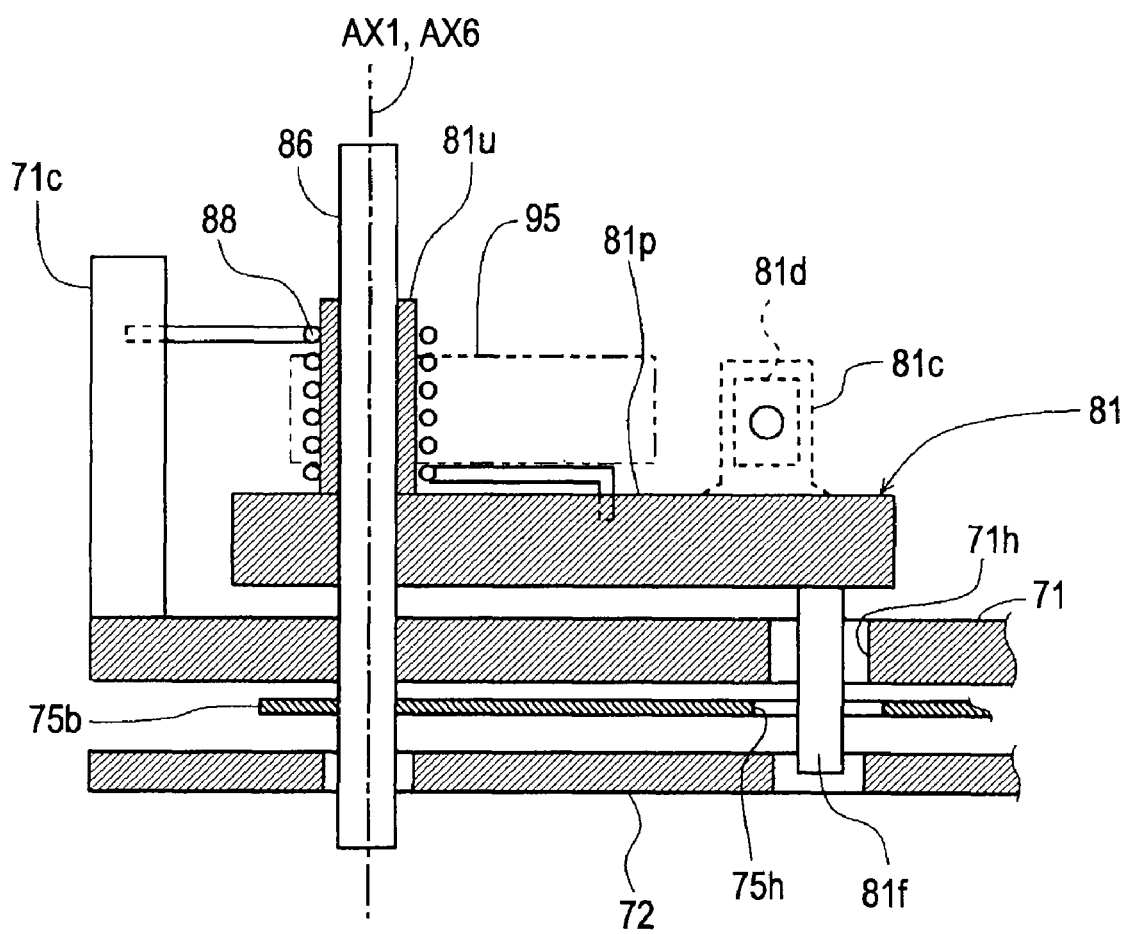
FIG. 10 is a sectional view taken along line X-X in FIG. 11.
Figure 11:
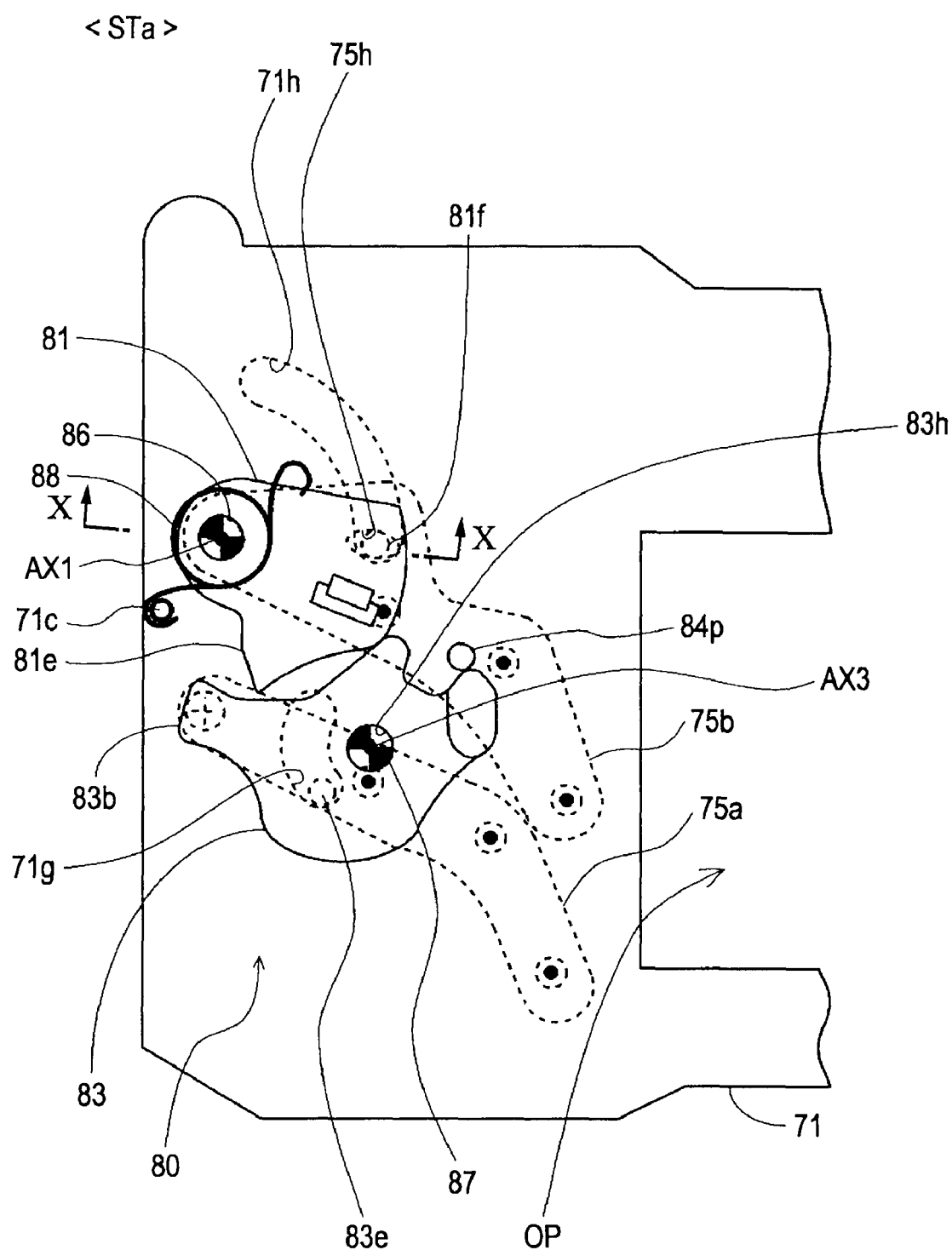
FIG. 11 shows a series of operations of a driving mechanism (a state STa immediately after completing exposure)
Figure 12:
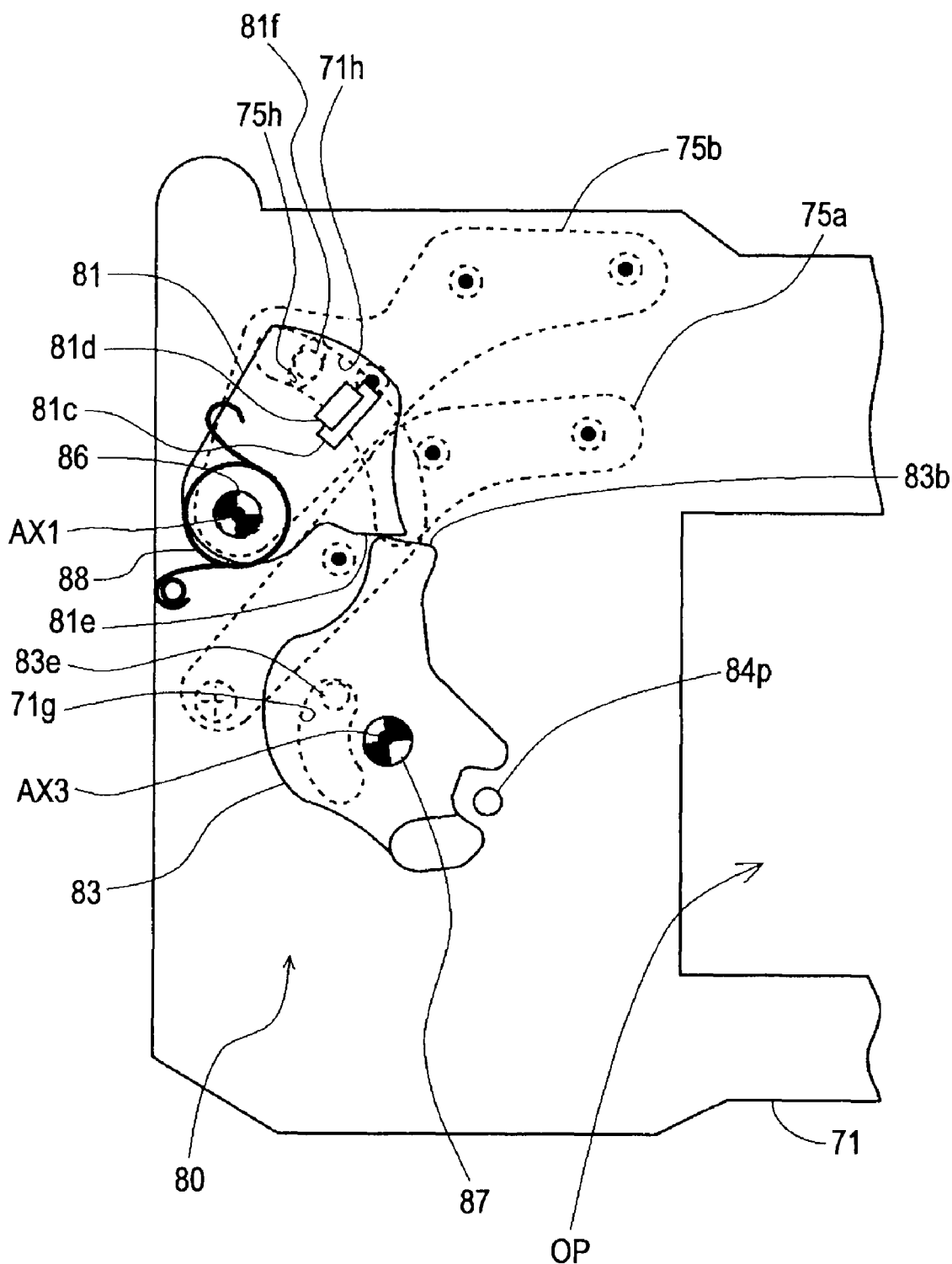
FIG. 12 shows a series of operations of the driving mechanism (a set state STs)
Figure 13:
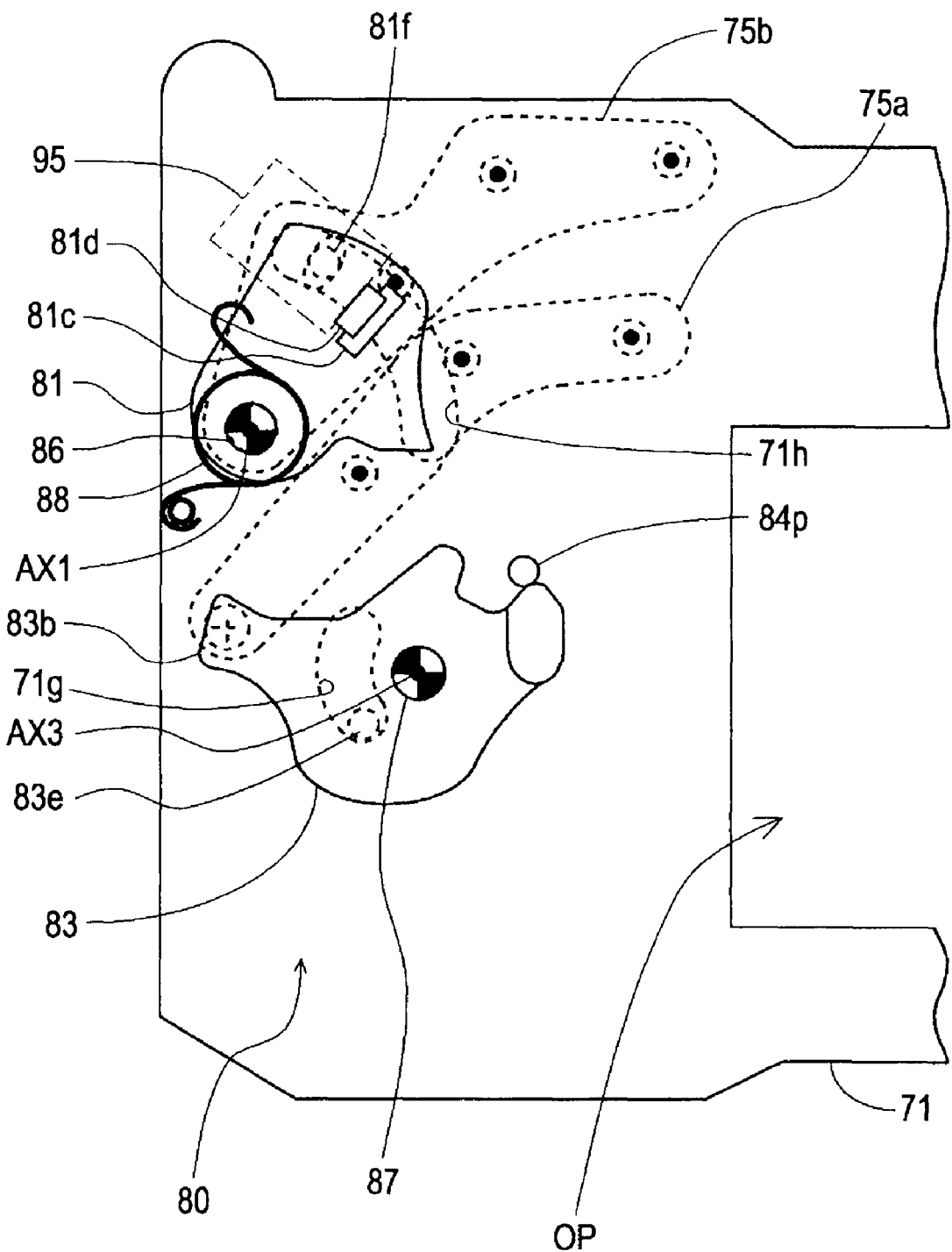
FIG. 13 shows a series of operations of the driving mechanism (a state STb immediately before starting exposure)

The arms 75a and 75b and the rear curtain are driven by the driving mechanism 80 (described next). FIGS. 8 and 9 show structural members 81 and 83 of the driving mechanism 80, respectively. FIG. 10 is a sectional view taken along line X-X in a plan view of FIG. 11. FIGS. 11 to 13 are plan views showing a series of movements of the driving mechanism 80. FIGS. 11 to 13 primarily show the driving mechanism 80, and does not show, for example, the rear curtain (rear blade groups 73a, 73b, and 73c).

As shown in FIG. 11, the driving mechanism 80 includes the driving member 81 (see FIG. 8) and the charging member 83 (see FIG. 9).

The driving member 81 and the charging member (also called a setting member) 83 are provided at the front side of the shutter bottom plate 71 (that is towards the front with respect to the sheet planes of, for example, FIGS. 5 and 11).

The driving member 81 is a rotating member which is substantially a plate and which can rotate around the axis AX1 as the center. A protruding member 71c, provided in a standing manner from the shutter bottom plate 71, and the driving member 81 are connected to each other by the spring 88 (see FIG. 10). The spring 88 applies a clockwise biasing force to the driving member 81.

Using the biasing force of the spring 88, the driving member 81 can move the rear curtain from the exposure start position to the exposure end position. In particular, the driving member 81 is rotated counterclockwise before the rear curtain starts moving, so that the clockwise biasing force of the spring 88 is further increased. This state is also expressed as a state in which the spring 88 is overcharged. When the spring 88 is overcharged, the rear curtain can be moved at a very high speed by rotating the driving member 81 at a very high speed.

As shown in FIG. 10, the driving member 81 is placed above the shutter bottom plate 71. More specifically, a shaft member 86, extending substantially perpendicularly and upward in FIG. 10, is provided in a standing manner at the shutter bottom plate 71. The shaft member 86 is fitted (fitted loosely) to a hole 81h of the driving member 81. By virtue of such a structure, the driving member 81 can be rotated around the shaft member 86 (more specifically, around the center axis AX1 of the shaft member 86) as the center.

The driving member 81 has a plate section 81p and a shaft section 81u. The shaft section 81u is provided around the hole 81h so as to be fitted to the shaft member 86.

The shaft section 81u has the aforementioned spring (more specifically, the torsion spring) 88 wound thereupon.

As shown in FIG. 8, the plate section 81p of the driving member 81 substantially has the shape of a fan in plan view.

Of two radial portions of the substantially fan-shaped plate section 81p, the lower radial portion in FIG. 8 of the plate section 81p is provided with a contact surface 81e. As described below, the contact surface 81e contacts an arm 83b of the charging member 83 during an overcharging operation (described below) related to the spring 88. Then, rotational driving force from the charging member 83 is transmitted through the arm 83b and the contact surface 81e, so that the overcharging operation of the spring 88 is carried out.

Further, the plate section 81p has a protruding portion 81c near an outer peripheral portion of the substantially fan-shaped plate section 81p. The protruding portion 81c protrudes forwardly from the front surface of the plate section 81p (that is, towards the front side with respect to the sheet plane of FIG. 8). An iron piece 81d is secured to the protruding portion 81c. In addition, an electromagnet 95 is provided at a height that is the same as that of the iron piece 81d in FIG. 10. When the driving member 81 is set at the rotational angle shown in FIG. 13 (described below), the iron piece 81d opposing the electromagnet 95 can be attracted by the electromagnet 95. Therefore, as described below, even by the attraction of the iron piece 81d by the electromagnet 95, the rotational movement of the driving member 81 can be restricted (see FIG. 13).

The plate section 81p is provided with a link pin 81f at an outer peripheral side of the substantially fan-shaped plate section 81p. The link pin 81f protrudes rearwardly from the back surface of the driving member 81. In particular, as shown in FIG. 10, the link pin 81f is inserted through the elongated hole 71h of the shutter base plate 71 and the hole 75h (also see FIG. 11) of the arm 75b. In addition, in an arc direction (longitudinal direction) of the arc-shaped elongated hole 71h, the diameter of the hole 75h is substantially the same as the diameter of the link pin 81f. Therefore, when the link pin 81f moves due to the rotation of the driving member 81 around the axis AX1, the arm 75b rotates around the axis AX6 (=AX1) as the center, so that the rear blade groups 73a, 73b, and 73c move, that is, the rear curtain performs an opening/closing operation. Since the rear curtain moves in response to the movement of the link pin 81f, the closed state shown in FIG. 7 and the open state shown in FIG. 8 are realized.

As shown in FIG. 9, the charging member 83 is a rotating member that can rotate around the axis AX3 as the center. More specifically, as shown in FIG. 11, a shaft member 87, extending substantially perpendicularly towards the front side of the sheet plane, is provided in a standing manner at a location in a plane that is different from the location of the shaft member 86 in the plane. In addition, a hole 83h (see FIG.

9) of the charging member 83 is fitted (loosely fitted) to the shaft member 87. By virtue of such a structure, the charging member 83 can rotate around the shaft member 87 (more specifically, around the center axis AX3 of the shaft member 87) as the center.

The charging member 83 has a recessed portion 83v (see FIG. 9). An end portion 84p of a link member 84 mechanically connected to a predetermined driving source (such as a motor) 85d (not shown) engages the recessed portion 83v.

When the end portion 84p of the link member 84 moves vertically in FIG. 9 (that is, in the directions of a double-headed arrow shown in FIG. 9), the charging member 83 rotates around the axis AX3, so that the rotational angle of the charging member 83 is changed.

The charging member 83 has the arm 83b protruding outward towards a side that is substantially opposite to the recessed portion 83v, with the axis AX3 being disposed between the recessed portion 83v and the arm 83b. In the vertical direction in FIG. 10, the charging member 83 substantially having the form of a plate is disposed at the same height as the driving member 81. In addition, the arm 83b is also disposed at the same height as the driving member 81. Therefore, as described below, when the charging member 83 receives a force from the end portion 84p of the link member 84, and is rotated clockwise around the axis AX3 as the center, the arm 83b of the charging member 83 pushes the contact surface 81e of the driving member 81, so that the driving member 81 rotates counterclockwise. This further increases the clockwise biasing force of the spring 88, so that the spring 88 is overcharged. The arm 83b may also be called a pushing section that pushes and moves the contact surface 81e. The contact surface 81e may also be called a push section (push surface) that is pushed and moved by the arm 83b.

Further, the charging member 83 has a pin 83e. At a position that is separated by approximately a distance r2 from the axis AX3 of the charging member 83, the pin 83e protrudes towards the back side from the back surface of the charging member 83. The pin 83e is inserted and provided in the elongated hole 71g of the shutter base plate 71.

Biasing force for rotating the charging member 83 counterclockwise by a spring 93 (not shown) is applied to the charging member 83. As shown in FIG. 11, by bringing the pin 83e into contact with the lower end of the elongated hole 71g, the counterclockwise rotation of the charging member 83 is restricted, and the charging member 83 stops at a predetermined position.

4. Operation of Shutter Device

Next, with reference to, for example, FIGS. 11 to 13, the movement of the shutter device 7 will be described.

FIG. 11 shows a state STa immediately after completing exposure of an actual shooting image. In FIG. 11, the rear curtain exists at the exposure end position, and covers the opening OP (which is in closed state)(see FIG. 6). In contrast, in FIGS. 12 and 13, the rear curtain exists at the exposure start position, and is withdrawn from the opening OP (which is in an open state)(see FIG. 7). FIG. 12 shows a set state STs (described later), and FIG. 13 shows a state STb immediately before starting exposure of the next actual shooting image.

As shown in FIG. 11, in the state STa immediately after completing exposure of the actual shooting image, the driving member 81 is biased clockwise around the axis AX1 as the center by the biasing force of the spring 88, and the link pin 81f of the driving member 81 comes into contact with and stops at the lower end of the elongated hole 71h. Therefore, in the state shown in FIG. 11, the structural parts 81 and 83 stop. For reducing shock that is produced when the link pin 81f strikes the lower end of the elongated hole 71h, it is desirable to provide a shock absorber at the lower end of the elongated hole 71h.

In FIG. 11, the pin 83e contacts the lower end of the elongated hole 71g, so that counterclockwise rotation of the charging member 83 is restricted, and the charging member 83 stops at a predetermined position. For reducing shock that is produced when the pin 83e strikes the lower end of the elongated hole 71g, it is desirable to provide a shock absorber at the lower end of the elongated hole 71g.

Next, a process for changing from the state STa shown in FIG. 11 to the state STs shown in FIG. 12 will be described.

First, the driving source 85d moves the end portion 84p of the link member 84 downward in FIG. 11, so that the charging member 83 rotates clockwise around the axis AX3 as the center. At this time, the arm 83b pushes the contact surface 81e, and the pushing force is transmitted to the driving member 81. Therefore, the pushing force transmitted to the contact surface 81e rotates the driving member 81 counterclockwise around the axis AX1 as the center.

In addition, when the charging member 83 is rotated clockwise by a predetermined angle around the axis AX3 as the center up to a position where the state STs in FIG. 12 is set, the driving member 81 is rotated counterclockwise by a predetermined angle around the axis AX1 as the center, so that the driving member 81 stops with the contact surface 81e being supported by the arm 83b. This makes it possible to further increase the clockwise biasing force of the spring 88, that is, to further increase stored energy of the spring 88. In other words, it is possible to provide spring energy. In the state STs in FIG. 12, since the biasing force of the spring 88 is further increased compared to that in the state STa in FIG. 11, the spring 88 is overcharged. In this way, the overcharging operation of the spring 88 is executed.

When the link pin 81f moves along the arc-shaped elongated hole 71h in accordance with the rotation of the driving member 81, the arm 75b rotates counterclockwise around the axis AX6 (=AX1) as the center. By this, the rear blade groups 73a, 73b, and 73c move up to the exposure start position (that is, the open position of the opening OP). That is, the opening operation of the rear curtain is realized (see FIGS. 7 and 12).

At this time, the arm 83b of the charging member 83 is in contact with the contact surface 81e of the driving member 81, and the driving member 81 is supported by the arm 83b. In this way, the rotation of the driving member 81 is restricted.

As described above, the process for changing from the state STa to the state STs is performed. By this, the spring 88 is in an overcharged state, and the rear curtain is moved to the exposure start position, so that the opening is caused to be in an open state by the rear curtain.

Next, a process for changing from the state STs (a second set state) shown in FIG. 12 to the state STb (a state immediately before starting exposure) will be described.

When, in the state STs shown in FIG. 12, the release button 11 is pressed up to a state S2, application of current to the electromagnet 95 (see FIG. 13) is started. That is, in accordance with an input of a shooting command, the application of current to the electromagnet 95 is started. The electromagnet 95 is provided at a position opposing the iron piece 81d of the driving member 81. By applying current to the electromagnet 95, the iron piece 81d is attracted to the electromagnet 95, and clockwise rotation of the driving member 81 is restricted.

Thereafter, when the end portion 84p of the link member 84 is driven upward, the biasing force of the spring 93 rotates the charging member 83 counterclockwise around the axis AX3 as the center. In accordance with this rotation, the arm 83b of the charging member 83 is separated from the contact surface 81e of the driving member 81, and the charging member 83 moves to a withdrawal position (also called a retreating position or a reference position)(see FIG. 13) where the charging member 83 is not in contact with the driving member 81. Since this state is a state in which the driving member 81 is disengaged from the charging member 83, this state is also called a "disengaged state."

Accordingly, the transition to the state STb shown in FIG. 13 ends. The state shown in FIG. 13 is a state immediately before starting exposure.

Figure 4:
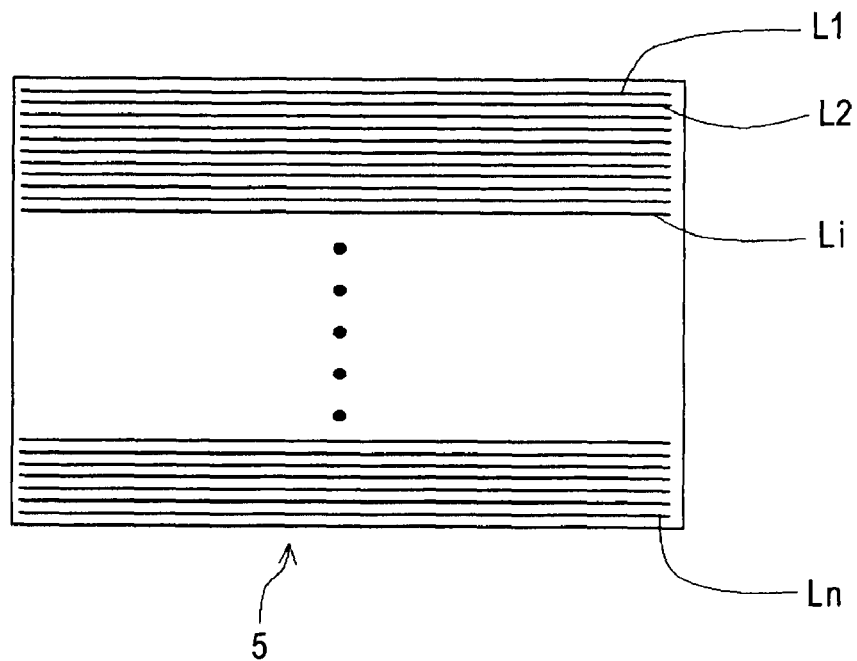
FIG. 4 shows each horizontal line in an image pickup element.

After the transition to the state STb shown in FIG. 13 ends, first, the electronic front curtain moves. More specifically, for example, as shown in FIG. 4, a reset operation is successively executed in a predetermined direction for each horizontal line Li in the image pickup element 5. This causes the electronic front curtain to move from the exposure start position towards the exposure end position, and to move downward (in a simulated manner) in FIG. 4.

Further, after the electronic front curtain has moved, the application of current to the electromagnet 95 is stopped at a predetermined timing. In accordance with the stoppage of the application of current, the driving member 81 upon which attraction force of the electromagnet 95 no longer acts is rotated clockwise around the axis AX1 as the center by the biasing force of the spring 88. At this time, since the spring 88 is overcharged, the driving member 81 can move at a very high speed. The movement of the driving member 81 causes the rear curtain to move (mechanically) downward in FIG. 4 from the exposure start position to the exposure end position.

More specifically, the link pin 81f moves downward along the elongated hole 71h due to the clockwise movement of the driving member 81. When the link pin 81f moves up to the lower end of the elongated hole 71h, the link pin 81f stops (see FIG. 11). By the movement of the link pin 81f, the arm 75b rotates clockwise around the axis AX6 (=AX1) as the center, that is, the rear blade groups 73a, 73b, and 73c move up to the exposure end position (that is, the position where the opening OP is closed). By this, the state returns to the state STa shown in FIG. 1, and the closing operation of the rear curtain is realized.

In this way, after the movement of the electronic front curtain is started, the application of current to the electromagnet 95 is stopped at a predetermined timing, so that the rear curtain (more specifically, the mechanical rear curtain) starts moving. In this way, the shutter is moved by what is called the electronic front curtain and the mechanical rear curtain, and an exposure operation for performing exposure on the image pickup element 5 over a predetermined period TE can be realized.

In this way, the process for changing from the state STb immediately before starting exposure shown in FIG. 13 to the state STa immediately after completing exposure shown in FIG. 11 is realized.

5. Controlling Operation of Electronic Front Curtain 5-1. High-Speed Shutter

Next, the controlling operations of the electronic front curtain will be described. The image pickup apparatus 1 according to the embodiment executes controlling operations performed when the shutter speed is relatively low and those performed when the shutter speed is relatively high differ slightly from each other. A case in which the shutter speed is higher than a predetermined threshold value (for example, a case in which the shutter speed is 1/500 seconds) will hereunder be described.

Figure 14:
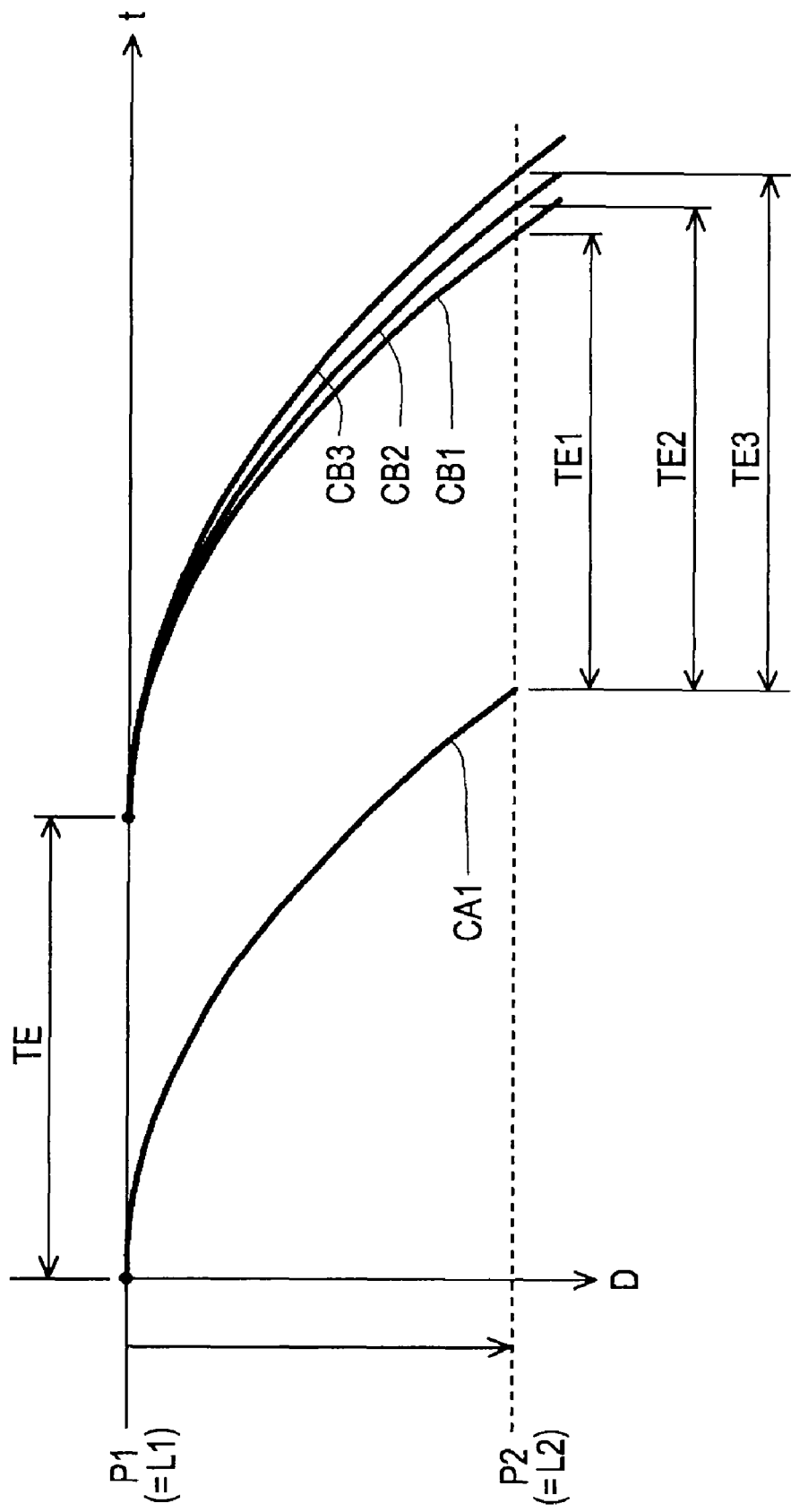
FIG. 14 shows a movement state of an electronic front curtain and movement states of a mechanical rear curtain.

FIG. 14 shows a movement state of the electronic front curtain and movement states of the mechanical rear curtain. The horizontal axis indicates time t, and the vertical axis indicates the positions of the front ends of the moving curtains. A curve CA1 indicates the movement state of the electronic front curtain, and curves CB1, CB2, and CB3 indicate the movement states of the mechanical rear curtain.

The curve CB1 is a movement curve of the mechanical rear curtain at an initial state of the shutter device 7 (more specifically, when the number N of expansions and compressions of the spring 88 is very small (N=N1)). When, in the state STb shown in FIG. 13, the application of current to the electromagnet 95 is stopped, the driving member 81 rotates, and the rear blade groups 73a, 73b, and 73c (that is, the rear curtain) start moving from an exposure start position P1 towards an exposure end position P2. At this time, an end portion of the rear curtain moves in accordance with a position changing curve such as the curve CB1. More specifically, the speed of the end portion of the rear curtain is very low near the exposure start position P1, after which the end portion is accelerated by the biasing force of the spring 88 to gradually increase the speed of the end portion. Then, when the end portion of the rear curtain passes the exposure end position P2, the speed of the end portion is very high.

At this time, the reset operations for the respective horizontal lines Li in the image pickup element 5 are carried out when necessary so that the end portion of the electronic front curtain moves in accordance with the curve CA1. By this, exposure over the period TE (=TE1) is carried out for the pixels associated with all of the horizontal lines Li.

When the rear curtain moves repeatedly (that is, performs the opening/closing operation repeatedly), and the spring 88 is repeatedly expanded and compressed, the biasing force of the spring 88 is reduced. Therefore, the speed of movement of the rear curtain is reduced. For example, the curve CB2 indicates a movement curve of the rear curtain after the rear curtain has moved by the number of times corresponding to that when the number of movements is N2 (for example, 10,000 times). The curve CB3 indicates a movement curve of the rear curtain after the rear curtain has moved by the number of times corresponding to that when the number of movements is N3 (for example, 30,000 times)(N3>N2). In this way, the movement characteristics of the rear curtain change in accordance with the number of movements of the rear curtain. More specifically, the movement acceleration and the movement speed of the rear curtain are reduced in accordance with an increase in the number of movements of the rear curtain.

If the electronic front curtain is assumed as moving in accordance with the curve CA1 even when the rear curtain moves in accordance with the curve CB2, the following problems arise.

More specifically, as indicated by the curve CB2 shown in FIG. 14, at a horizontal line (such as a horizontal line Ln) near the exposure end position P2, an arrival time of the rear curtain is delayed from an actual arrival time due to a reduction in the biasing force of the spring 88. At this time, when the electronic front curtain is moved in accordance with the curve CA1, the pixel of the horizontal line (Ln) is exposed over a period TE2. The period TE2 is a period that is longer than the actual exposure period TE (=TE1). That is, the period of exposure near the exposure end position P2 is longer than the actual exposure period. In contrast, the exposure period TE near the exposure start position Pi is substantially the same as a theoretical value TE1.

As a result, the exposure period TE2 near the exposure end position P2 is longer than the exposure period TE near the exposure start position P1. That is, the difference between the time of passage of the front curtain and the time of passage of the rear curtain at each position in the image pickup area, that is, the exposure period (shutter speed) varies in the image pickup area.

Similarly, when the opening/closing operation of the rear curtain is further repeated, and the rear curtain moves in accordance with the curve CB3, if the electronic front curtain is moved in accordance with the curve CA1, a similar problem arises. In particular, since the deterioration of the spring 88 progresses in accordance with the rear curtain further performing opening/closing operations, the amount of variation of the exposure period in the image pickup element is further increased.

To overcome this problem, in the image pickup apparatus 1 according to the embodiment, data DT indicating changes in movement characteristics of the rear curtain with time (deterioration with time) is stored in the characteristics storage section 111, and movement characteristics of the electronic front curtain are changed in accordance with the changes of the movement characteristics of the rear curtain with time, on the basis of the data DT.

Here, as the data DT indicating the changes in the movement characteristics of the rear curtain with time, the position changing curves that are in accordance with the number of movements of the rear curtain are stored. That is, the data DT is data indicating the relationship between the number N of movements of the rear curtain and the movement characteristics (position changing curves) of the rear curtain. For example, the position changing curves corresponding to a plurality of values N (N=N1, N2, N3, . . . ) are stored.

Figure 15:
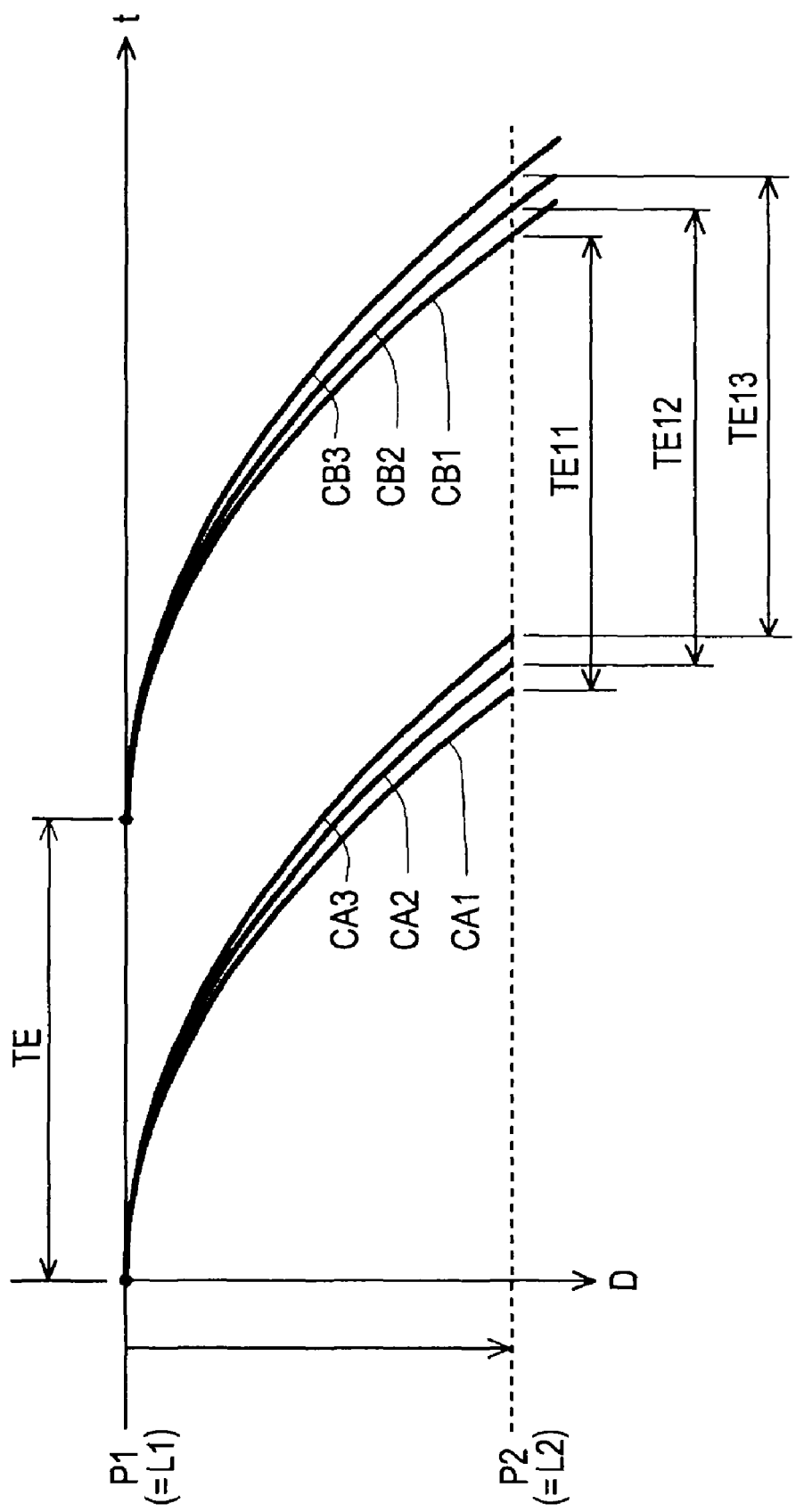
FIG. 15 shows changes in movement timings of the electronic front curtain (during high-speed shutter operation)

In detail, as shown in FIG. 15, the shutter controlling section 112 reduces the movement speed of the electronic front curtain in accordance with an increase in the number of movements of the rear curtain. More specifically, the shutter controlling section 112 reduces the acceleration of the electronic front curtain in accordance with an increase in the number of movements of the rear curtain. In other words, the magnitude of a change in speed in the position changing curve of the electronic front curtain is reduced in accordance with an increase in the number of movements of the rear curtain.

For example, when it is determined that the rear curtain has repeated opening/closing operations by the number of times corresponding to that when the number of movements of the rear curtain is N2, the shutter controlling section 112 moves the electronic front curtain in accordance with a curve CA2 whose speed and acceleration are less than those of the curve CA1. More specifically, the shutter controlling section 112 changes (increases) a time interval between the reset operations for the respective horizontal lines (that is, a time interval between the reset operations for adjacent horizontal lines) in accordance with the curve CA2. Even more specifically, as it moves from the exposure start position to the exposure end position, the amount of increase of the time interval between the reset operations for the respective horizontal lines is gradually increased. The image pickup apparatus 1 stores the number of opening/closing operations (number of movements) in a predetermined storage section (such as a nonvolatile storage section in the overall controlling section 101 or a nonvolatile storage section that is independent of the overall controlling section 101).

When the opening/closing operations of the rear curtain are repeated by the number of times corresponding to that when the number of movements is N2, the rear curtain substantially moves in accordance with the curve CB2. At this time, an exposure period TE12 for a horizontal line (such as a horizontal line Ln) near the exposure end position P2 is a value very close to the actual exposure period TE. Therefore, it is possible to eliminate or restrict variations in the exposure period in the image pickup area.

Similarly, when it is determined that opening/closing operations of the rear curtain are repeated by the number of times corresponding to that when the number of movements is N3, the shutter controlling section 112 moves the electronic front curtain in accordance with a curve CA3 whose speed and acceleration are even less than those of the curve CA2. More specifically, the shutter controlling section 112 changes (increases) a time interval between the reset operations for the respective horizontal lines in accordance with the curve CA3. Even more specifically, as the rear curtain moves from the exposure start position to the exposure end position, the amount of increase of the time interval between the reset operations for the respective horizontal lines is gradually increased.

When the opening/closing operations of the rear curtain are repeated by the number of times corresponding to that when the number of movements is N3, the rear curtain substantially moves in accordance with the curve CB3. At this time, an exposure period TE13 for a horizontal line (such as a horizontal line Ln) near the exposure end position P2 is a value very close to the actual exposure period TE. Therefore, it is possible to eliminate or restrict variations in the exposure period in the image pickup area.

In the foregoing description, the movements of the electronic front curtain when the numbers of movements are N2 and N3 are described. However, the electronic front curtain may be similarly controlled so that it moves in accordance with the position changing curve CA corresponding to any other number of opening/closing operations (movements) of the rear curtain. More specifically, the time interval between the reset operations for the respective horizontal lines is changed so that the electronic front curtain moves in accordance with the position changing curve CA corresponding to the number of movements of the rear curtain. The position changing curves for all values N are not previously provided. For example, the position changing curve corresponding to that when the actual number of movements is Na may be obtained by interpolation on the basis of the two position changing curves CA2 and CA3 corresponding, respectively, to two close values N2 and N3 (N2<Na<N3).

As described above, when the shutter speed is higher than a predetermined threshold value, the magnitude of change in speed in the position changing curve of the electronic front curtain is reduced in accordance with an increase in the number of movements of the rear curtain. In other words, the movement speed and the movement acceleration of the electronic front curtain are reduced in accordance with an increase in the number of movements of the rear curtain. According to this, the exposure period can be more precisely and simply controlled considering a change in the spring characteristics of the rear curtain with time (that is, deterioration with time). In other words, considering a change resulting from expansion and compression of the spring 88 with time (that is, deterioration with time), it is possible to easily control variations in the exposure period that depend upon the respective positions in the image pickup area (that is, the respective positions in the direction of movement of the rear curtain).

5-2. Low-Speed Shutter

Next, a case in which the shutter speed is lower than a predetermined threshold value (such as when the shutter speed is 1/10 seconds) will be described.

When the shutter speed is relatively low, that is, when the exposure period TE is relatively long, a time (such as a few milliseconds) in which the rear curtain moves from the exposure start position P1 to the exposure end position P2 is relatively small compared to the exposure period TE. Therefore, it is not necessary to move the electronic front curtain in accordance with curves CA shown in FIG. 15.

Figure 16:
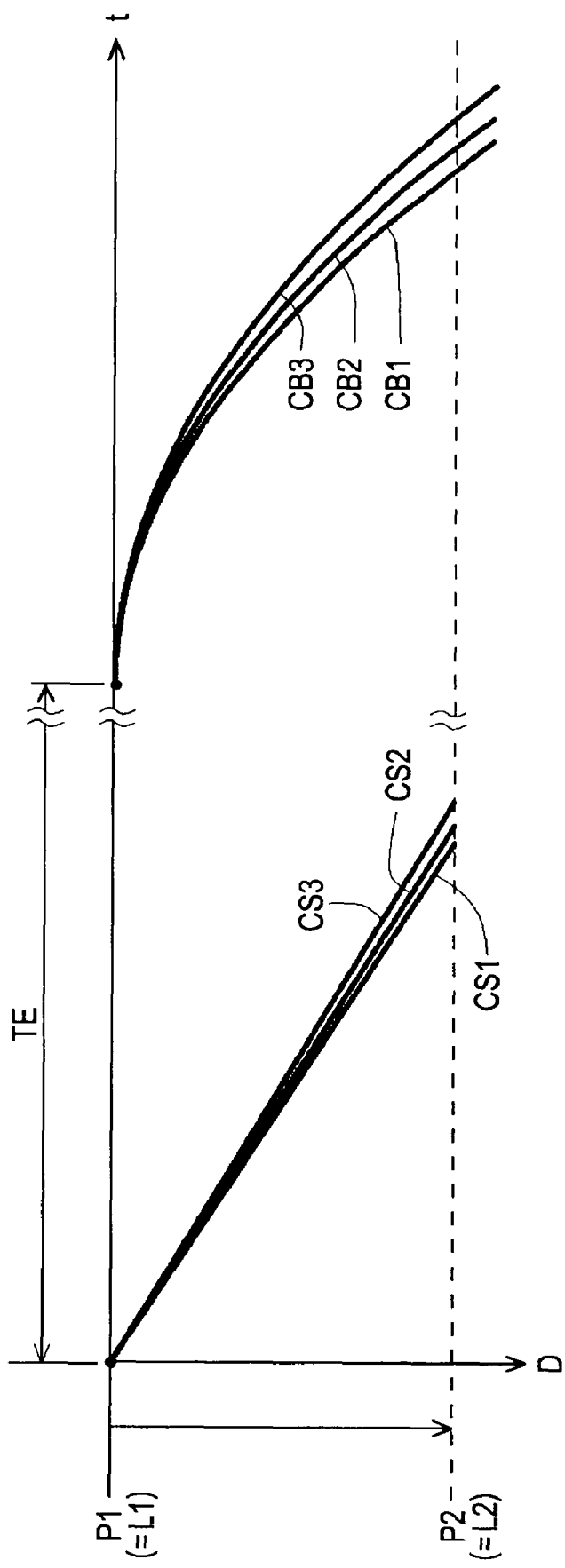
FIG. 16 shows changes in movement timings of the electronic front curtain (during low-speed shutter operation)

For example, as shown in FIG. 16, the electronic front curtain may be moved in accordance with linear approximate curves (straight lines) CS. Here, a plural number of linear straight lines CS corresponding to an increase in the number of movements of the rear curtain are used.

For example, since, at an initial stage, the rear curtain has not yet moved, and the spring 88 has not yet deteriorated, the approximate curve CS1 close to a theoretical value is used. That is, the electronic front curtain is moved in accordance with the straight line CS1.

When it is determined that the opening/closing operations of the rear curtain are repeated by the number of times corresponding to that when the number of movements is N2, the electronic front curtain is moved in accordance with the straight line CS2. More specifically, the time interval between the reset operations for the respective horizontal lines is changed (that is, is increased) so that the electronic front curtain moves in accordance with the straight line CS2. Here, the inclination of the straight line CS2 is less than the inclination of the straight line CS1, and the straight line CS2 is a movement characteristic curve in which the speed is less than that of the straight line CS1. According to such a movement, compared to when the electronic front curtain is moved in accordance with the straight line CS1, an exposure period for a horizontal line (such as a horizontal line Ln) near the exposure end position P2 is a value that is relatively close to an exposure period for a horizontal line (such as a horizontal line L1) near the exposure start position P1. Therefore, it is possible to eliminate or restrict variations in the exposure period in the image pickup area.

Further, when it is determined that the opening/closing operations of the rear curtain are repeated by the number of times corresponding to that when the number of movements is N3, the electronic front curtain is moved in accordance with the straight line CS3. More specifically, the time interval between the reset operations for the respective horizontal lines is changed (that is, is increased) so that the electronic front curtain moves in accordance with the straight line CS3. The inclination of the straight line CS3 is less than the inclination of the straight line CS2, and the straight line CS3 is a movement characteristic curve in which the speed is less than that of the straight line CS2. According to such a movement, compared to when the electronic front curtain is moved in accordance with the straight line CS1, an exposure period for a horizontal line (such as a horizontal line Ln) near the exposure end position P2 is a value that is relatively close to an exposure period for a horizontal line (such as a horizontal line L1) near the exposure start position P1. Therefore, it is possible to eliminate or restrict variations in the exposure period in the image pickup area.

In the foregoing description, the movements of the electronic front curtain when the numbers of movements are N2 and N3 are described. However, the electronic front curtain may be similarly moved in accordance with the position changing curve (straight line) CS corresponding to any other number of opening/closing operations (number of movements) of the rear curtain.

As described above, when the shutter speed is less than a predetermined threshold value, the electronic front curtain is moved at a certain speed, and the certain speed of the electronic front curtain is reduced in accordance with an increase in the number of movements of the rear curtain. That is, the movement speed of the electronic front curtain is reduced in accordance with an increase in the number of movements of the rear curtain. According to this, the exposure period can be more precisely and simply controlled considering a change in the spring characteristics of the rear curtain with time. In particular, when the electronic front curtain is moved in accordance with the approximate curve (straight line) CS, it is possible to easily control variations in the exposure period that depend upon the respective positions in the image pickup area (that is, the respective positions in the direction of movement of the rear curtain), considering a change resulting from expansion and compression of the spring 88 with time (that is, deterioration with time).

6. Modifications, Etc.

Although an embodiment according to the present invention is described above, the present invention is not limited to the content described above.

For example, although, in the embodiment, the case in which the electronic front curtain is moved in accordance with the straight line CS when the shutter speed is low is exemplified, the present invention is not limited thereto. For example, even when the shutter speed is low, similarly to when the shutter speed is high, the electronic front curtain may be moved in accordance with the curve CA (more specifically, the curves CA1, CA2, CA3, . . . ). Alternatively, the aforementioned correction may be executed only when the shutter speed is high, without executing it when the shutter speed is low.

Figure 17:
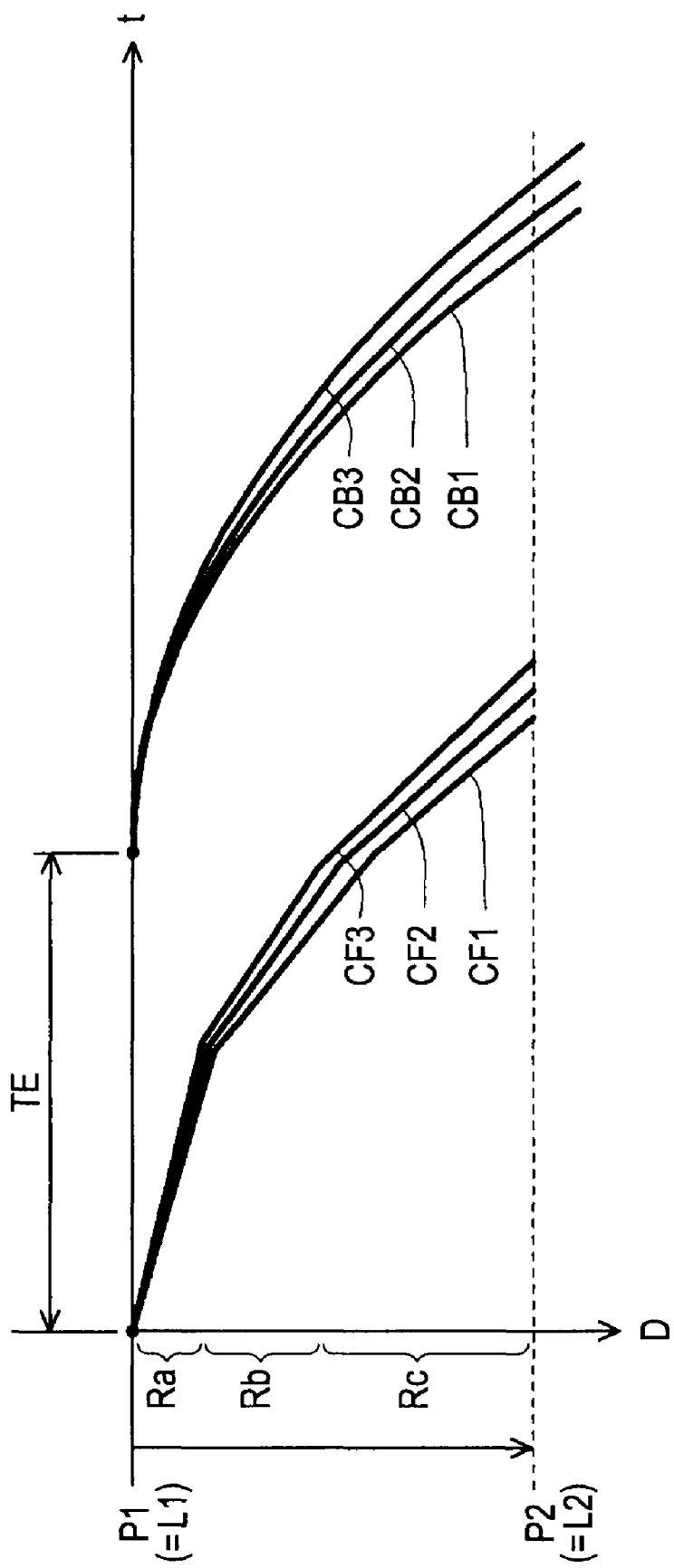
FIG. 17 shows movements of a modified electronic front curtain.

Although, in the embodiment, the case in which the electronic front curtain is moved along the smoothly changing position changing curve CA when the shutter speed is high is exemplified, the present invention is not limited thereto. For example, as shown in FIG. 17, it is possible to divide the position changing curves into a plurality of ranges Ra, Rb, and Rc, and make them approximate to straight lines in these ranges. In addition, the electronic front curtain may be moved in accordance with any of such approximate curves CF (more specifically, the curves CF1, CF2, CF3, . . . ). More specifically, when the number of movements of the rear curtain is close to the value N1, the electronic front curtain may be moved in accordance with the approximate curve CF1 (that is, a curve that approximates to the curve CA1). In addition, when the number of movements of the rear curtain reaches the value N2, the electronic front curtain may be moved in accordance with the approximate curve CF2 (that is, a curve that approximates to the curve CA2). Further, when the number of movements of the rear curtain reaches the value N3, the electronic front curtain may be moved in accordance with the approximate curve CF3 (that is, a curve that approximates to the curve CA3). The speed and acceleration of the approximate curve CF2 are less than the speed and acceleration of the approximate curve CF1. The speed and acceleration of the approximate curve CF3 are less than the speed and acceleration of the approximate curve CF2.

Although, in the embodiment, the case in which each reset operation is executed at a different timing with each horizontal line Li when the reset operations are successively performed on a plurality of pixels in the image pickup element 5 in a predetermined direction is exemplified, the present invention is not limited thereto. For example, each reset operation may be executed at a different timing with every plurality of horizontal lines. Further, each reset operation may be performed at a different timing with every one horizontal line or every plurality of horizontal lines. Even by these methods, it is possible to successively reset a plurality of pixels in the image pickup element 5 in a predetermined direction and move the electronic front curtain from the exposure start position to the exposure end position in a simulated manner.

The present application contains subject matter related to that disclosed in Japanese Priority Patent Application JP 2008-210392 filed in the Japan Patent Office on Aug. 19, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image pickup apparatus comprising:
controlling means for moving an electronic front curtain in a simulated manner from an exposure start position towards an exposure end position by successively performing reset operations on a plurality of pixels in an image pickup element in a predetermined direction;
a rear curtain that moves from the exposure start position towards the exposure end position by a biasing force of biasing means; and
storage means for storing data indicating a change in movement characteristics of the rear curtain based on deterioration of the biasing means over time,
wherein, based on the data, the controlling means changes movement characteristics of the electronic front curtain in accordance with the change in the movement characteristics of the rear curtain over time,
wherein the change in the movement characteristics of the rear curtain is a change in the movement characteristics corresponding to a number of movements of the rear curtain,
wherein the data based on the deterioration of the biasing means includes a plurality of predetermined threshold levels of the number of movements of the rear curtain, which predetermined threshold levels correspond to time-based movement curves of the rear curtain, and
wherein the movement characteristics of the electronic front curtain are controlled based on one of the plurality of predetermined of predetermined threshold levels of the number of movements of the rear curtain.

2. The image pickup apparatus according to claim 1, wherein the controlling means reduces a movement speed of the electronic front curtain in accordance with an increase in the number of movements of the rear curtain.

3. The image pickup apparatus according to claim 2, wherein the controlling means reduces a movement acceleration of the electronic front curtain in accordance with the increase in the number of movements of the rear curtain.

4. The image pickup apparatus according to claim 1, wherein, when a shutter speed is higher than a predetermined threshold value, the controlling means reduces a magnitude of a speed change in a position changing curve of the electronic front curtain, in accordance with an increase in the number of movements of the rear curtain.

5. The image pickup apparatus according to claim 1, wherein, when a shutter speed is lower than a predetermined threshold value, the controlling means moves the electronic front curtain at a certain speed, and reduces the certain speed in accordance with an increase in the number of movements of the rear curtain.

6. The image pickup apparatus according to claim 1, wherein the controlling means moves the electronic front curtain in the simulated manner from the exposure start position towards the exposure end position by successively resetting a stored charge of each of the pixels in the image pickup element with every line in the image pickup element.

7. The image pickup apparatus according to claim 1, wherein the biasing means is a spring.

8. The image pickup apparatus according to claim 7, wherein the data based on the deterioration of the spring over time includes data regarding a change in spring characteristics resulting from repeated expansion and compression of the spring.

9. An image pickup apparatus comprising:
a controlling unit moving an electronic front curtain in a simulated manner from an exposure start position towards an exposure end position by successively performing reset operations on a plurality of pixels in an image pickup element in a predetermined direction;
a rear curtain that moves from the exposure start position towards the exposure end position by a biasing force of a biasing unit; and
a storage unit storing data indicating a change in movement characteristics of the rear curtain based on deterioration of the biasing unit over time,
wherein, based on the data, the controlling unit changes movement characteristics of the electronic front curtain in accordance with the change in the movement characteristics of the rear curtain over time,
wherein the change in the movement characteristics of the rear curtain is a change in the movement characteristics corresponding to a number of movements of the rear curtain,
wherein the data based on the deterioration of the biasing unit includes a plurality of predetermined threshold levels of the number of movements of the rear curtain, which predetermined threshold levels correspond to time-based movement curves of the rear curtain, and
wherein the movement characteristics of the electronic front curtain are controlled based on one of the plurality of predetermined of predetermined threshold levels of the number of movements of the rear curtain.

10. The image pickup apparatus according to claim 9, wherein the biasing unit is a spring.

11. The image pickup apparatus according to claim 10, wherein the data based on the deterioration of the spring over time includes data regarding a change in spring characteristics resulting from repeated expansion and compression of the spring.

* * * * *